United States Patent [19]

Alexander

[11] Patent Number: 5,313,681
[45] Date of Patent: May 24, 1994

[54] VERTICALLY STORING DOCK LEVELER

[75] Inventor: James C. Alexander, London, Canada

[73] Assignee: The Serco Corporation, Ontario, Canada

[21] Appl. No.: 979,227

[22] Filed: Nov. 20, 1992

Related U.S. Application Data

[63] Continuation of Ser. No. 669,128, Mar. 13, 1991, abandoned, which is a continuation-in-part of Ser. No. 331,983, Apr. 3, 1990, Pat. No. 5,001,799.

[51] Int. Cl.⁵ .................................................. E01D 1/00
[52] U.S. Cl. ........................................ 14/71.1; 14/71.5
[58] Field of Search ...................... 14/71.1, 71.3, 71.5, 14/69.5; 52/173 DS; 49/475

[56] References Cited

U.S. PATENT DOCUMENTS

| | | | |
|---|---|---|---|
| 4,178,717 | 12/1979 | Sakauye | 49/475 |
| 4,209,869 | 7/1980 | Trine et al. | 14/69.5 |
| 4,293,969 | 10/1981 | Frommelt | 14/71.1 |
| 4,557,008 | 12/1985 | Jurden | 14/71.7 |
| 4,679,364 | 7/1987 | Fettig et al. | 52/173 DS |
| 4,776,052 | 10/1988 | Delgado et al. | 14/71.7 |

Primary Examiner—Kenneth J. Dorner
Assistant Examiner—Nancy P. Connolly
Attorney, Agent, or Firm—Sughrue, Mion, Zinn, Macpeak & Seas

[57] ABSTRACT

A seal for a vertically storing dock leveler employs a foam pad connected to the underside of the deck. As the leveler is lowered, the pad contacts the shelf on to which the leveler is mounted and deflects inward and compresses to seal the space between the underside of the leveler and the shelf. The pad is a tapered foam with a fabric covering.

20 Claims, 5 Drawing Sheets

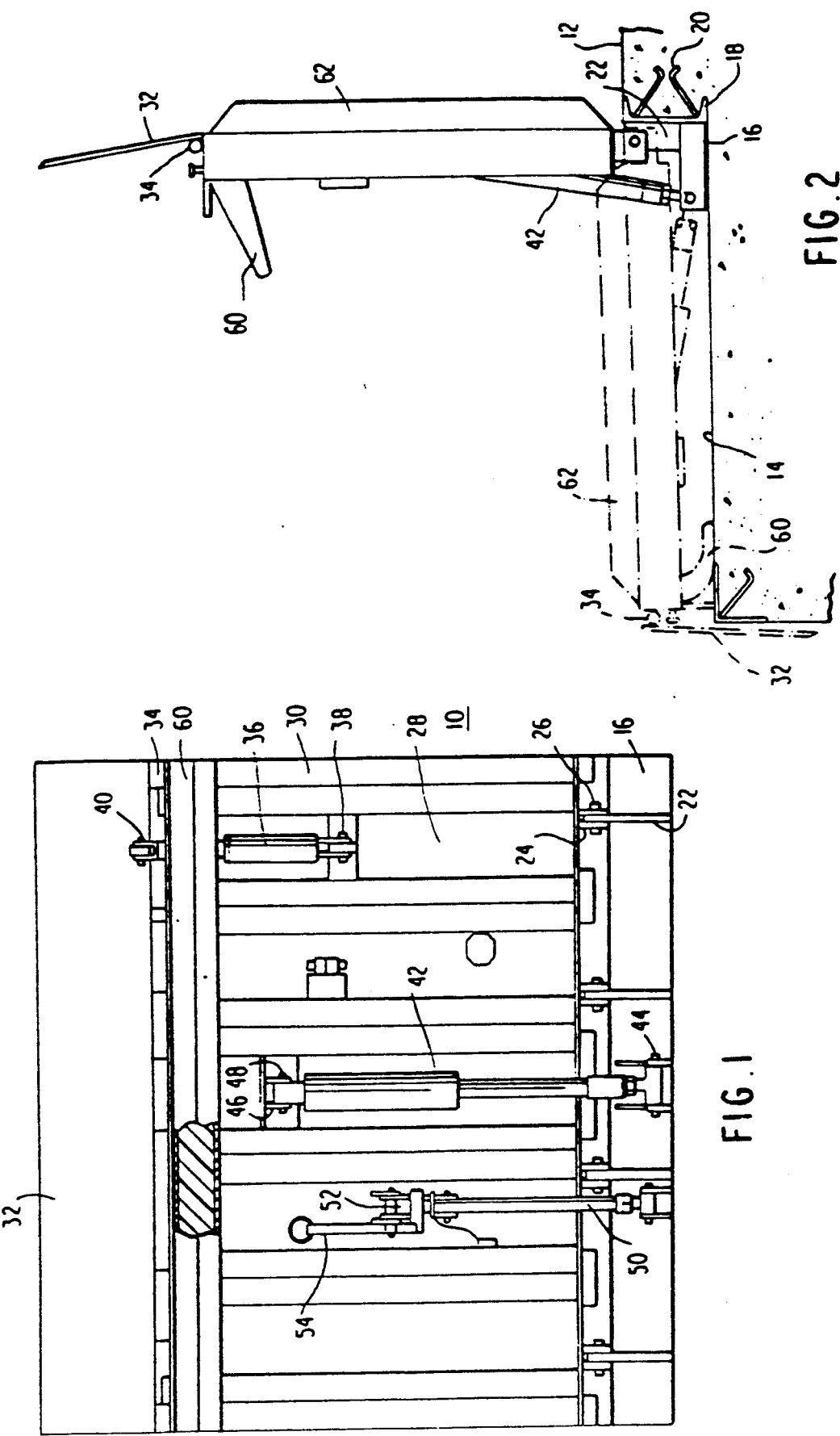

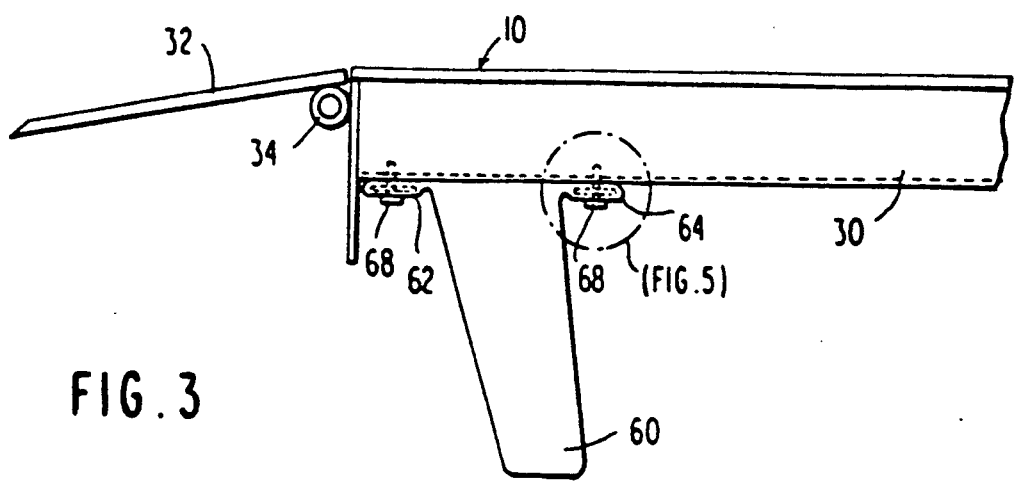
FIG. 3
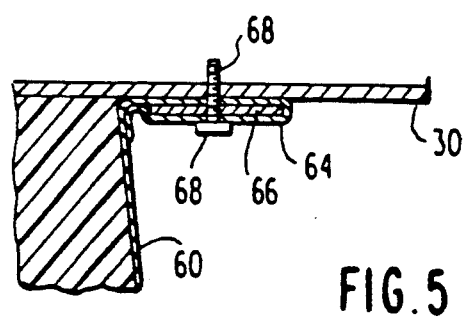
FIG. 5
FIG. 4
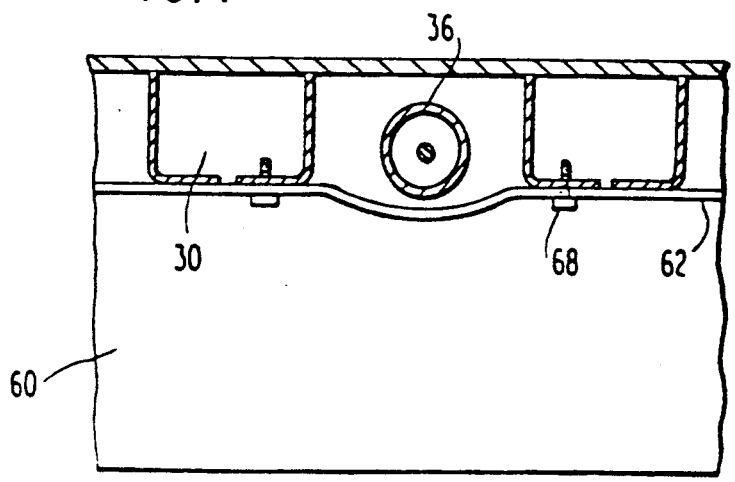

VERTICALLY STORING DOCK LEVELER

BACKGROUND OF THE INVENTION

This application is a continuation of application Ser. No. 07/669,128, now abandoned, which is a continuation-in-part of application Ser. No. 07/331,983 filed on Apr. 3, 1990 now U.S. Pat. No. 5,001,799.

This invention relates to dock levelers and in particular, to levelers which store vertically. Such devices are used at loading docks to bridge the distance between a truck to be loaded, or unloaded, and the interior of a warehouse, storage facility, or the like. In general, these devices accommodate for both the distance between the end of the truck and the dock facility, and the vertical truck "float" as it is loaded and unloaded. That is, the truck will move vertically depending on its state of loading.

For this purpose, dock levelers utilize a lip which extends onto the truck deck and is movable in response to truck float. Generally, such levelers fall into two categories, those which store horizontally with the lip in a downward or pendent position and those which store vertically with the lip generally upward. In both cases, when not in use a roll-down door or the like is used to seal the opening. When the truck backs into the dock for purposes of loading or unloading, the door is opened and the space is generally sealed by means of fixed or adjustable dock seals comprising foam, fabric, inflatable cells or the like which are mounted on the sides of the dock and at the header or top. Such seals are well known and are in common use. In the case of horizontally stored dock levelers, since they are generally mounted into a pit or recess there is no open area underneath the leveler which requires a weather seal.

In contrast, in the case of vertically storing levelers there is a propensity for heat loss or entry into a building since the leveler is generally on a shelf rather than in a pit. In the past, to seal this area it has been conventional to use a pad mounted to the bottom of the face of the building under the dock leveler. However, because the dock leveler lip must be lowered to service a truck which is fully loaded, such a bottom pad is usually complex and has a pocket which in turn becomes a trap for debris. Additionally, such a structure is vulnerable to impact damage by trucks.

Another problem with vertically storing levelers is that the lip is narrower than the truck width. The dock opening thus has exposed sides which permits heat transfer. Conventional wedges and side pads do not effectively seal this area. A sealing mechanism is thus required which at the same time allows the leveler to move vertically into the stored position when not in use.

SUMMARY OF THE INVENTION

Given this deficiency in the prior art, it is an object of this invention to provide an improved vertically storing dock leveler which carries its own seal.

Yet another object of this invention is a seal for a vertically storing dock leveler which deflects inward and compresses to seal the area from the underside of a lowered dock leveler to the shelf.

Yet another advantage of this invention is to provide for an improved seal usable with a vertically storing dock leveler which has an extended range of deflection to accommodate for various truck heights as the truck is loaded and unloaded yet still provide a weather seal for the underside of the leveler.

These and other objects of this invention are accomplished by means of a vertically storing dock leveler which employs a deck seal attached to the underside of the leveler deck. The seal is constructed of a resilient foam. The seal maybe a wedged shaped pad which deflects through bending rather than pure compression. By deflecting, compensation for varying heights of the deck assembly is achieved. By this invention, a unitary seal across the front of the leveler is provided.

The seal may be fixed or hang for pivoting action as the deck and is raised or lowered. Also, the side seals provide a wedge between the dock and lip to seal the space when the leveler is lowered.

This invention will be described in greater detail by referring to the attached drawing and the description of the preferred embodiment that follows.

BRIEF DESCRIPTION OF THE DRAWING

FIG. 1 is a front elevation of the vertically stored dock leveler in accordance with this a first preferred embodiment of this invention;

FIG. 2 is an end sectional view of the dock leveler of FIG. 1 illustrating the leveler in the vertical stored position, and in the horizontal position with the lip in a lower pendant position such that the board is at its lowest most point of travel, FIG. 3 is an enlarged partial end view illustrating the details of attachment, FIG. 4 is an enlarged partial front view illustrating deflection over the hydraulic cylinder, FIG. 5 is an enlarged view showing further details of attachment of the seal.

DESCRIPTION OF PREFERRED EMBODIMENTS

Figure 6A:
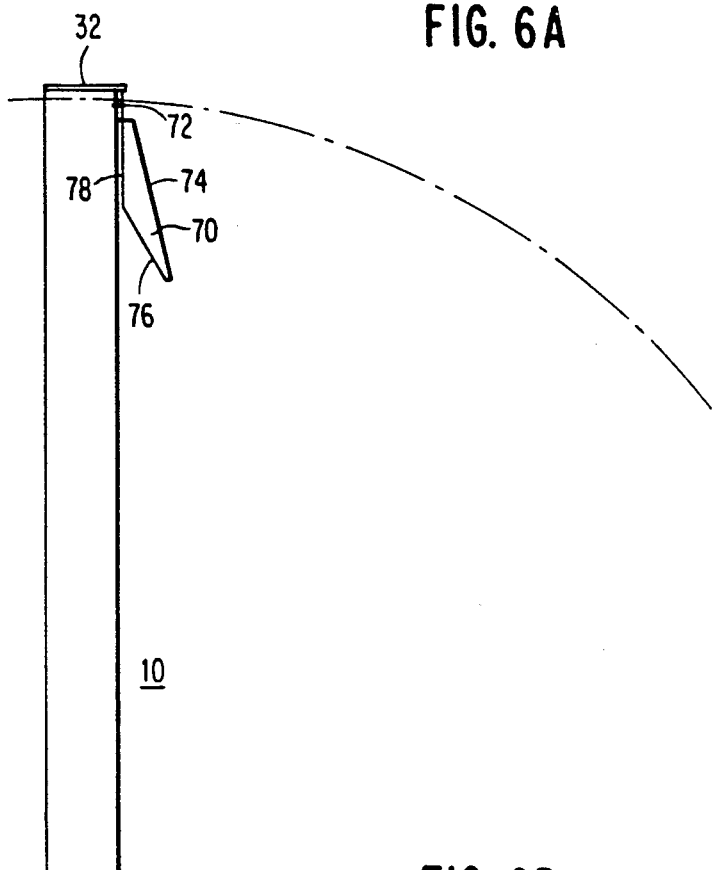
FIGS. 6A, 6B and 6C illustrate side views of a second preferred embodiment of a bottom seal with the leveler stored vertically, extended in an operative position and extended in a below dock level position.

As illustrated in the drawings, this invention relates to a vertically stored dock leveler 10. The leveler is mounted onto a loading dock 12 which itself has a pit which is located at an elevation below that of the dock surface 12. While not illustrated, the leveler is mounted in a doorway of a building, the doorway generally being closed by an overhead door, also not shown. Surrounding that doorway, conventionally foam seals are used to provide a technique by which the outer walls of a truck contact the resilient material and a deformation to seal the opening as the truck is loaded or unloaded.

The dockboard or leveler 10 comprises, generally, a support structure or a frame 16 which extends outwardly from a channel 18 which is embedded to the rear wall of the pit by means of anchors 20 or the like. Mounting members or lugs 22 form a part of the frame to which the dockboard is hinged via lugs 24 and a hinge pin 26. As illustrated in FIG. 1, four such points of attachment are illustrated.

The leveler further comprises a deck surface 28 supported by a series of parallel beams 30. Those beams may take any conventional form such as I-channel, C-channel, or the like. In the case of fixed hinges, as illustrated herein, it is preferable that the beams 30 be a split box beam to reduce torsional loading on the dock leveler, yet maintain and provide the necessary strength.

The leveler also includes a lip 32 which is pivotally connected to the deck by means of a hinge 34. The lip 32 is movable independently of the position of the deck by means of hydraulic cylinder 36. The hydraulic cylinder 36 has one end attached to the lower portion of the deck by means of pivot pin 38 with its piston rod hinged to the lip 32 by means of pin 40.

Movement of the deck itself is achieved by means of hydraulic cylinder 42. The cylinder has its lower end pivotally connected to a series of lugs by means of pivot pin 44. The upper end thereof is pivotally connected to the deck by means of lugs 46 and pivot pin 48. It will be appreciated by those knowledgeable in this technology that while a hydraulic cylinder is used for actuation of both the lip 32 and the deck 28, other types of actuation may be employed.

The leveler also includes a toggle lock assembly having a pair of links 50 and 52. That lock assembly is actuated by means of a pull chain and arm 54. Such an assembly may be that which is disclosed in U.S. Pat. No. 4,776,052.

In accordance with this invention a bottom pad 60 is employed which comprises a resilient foam having a fabric cover. The bottom pad is secured to the underside of the deck allowing only an opening for actuation by the hydraulic cylinder 36 for lip actuation.

FIG. 2 illustrates the dock leveler in two positions. In the vertical stored position the lip 32 is disposed generally upward. As can be seen, the foam is a wedge shape which protrudes slightly backward from the forward most portion of the dock leveler.

As the dock leveler is lowered, the distal end of the pad 60 contacts the pit surface 14. Continued downward motion of the leveler, as illustrated in FIG. 2, causes rearward deflection of the foam pad. Given the size of the pad, sealing occurs at first contact with the pit 14 and continues as the leveler moves further downward to accommodate a truck as it is being loaded. It will be appreciated that as the truck is unloaded and the leveler raises while the deflection of the pad will reduce, sealing will still occur.

Thus, in accordance with this invention the mode of sealing is primarily one of deflection rather than compression. The use of a conventional foam pad system would require a significant amount of compression at the lowest position and that force of compression would impede the ability of the pad to recover its shape. By allowing the pad to deflect, a greater range of dock leveler operation is achieved, with the foam pad deflecting under less force.

An important advantage of this system is that when the leveler is in its vertical raised position as illustrated in FIG. 2, the pit area is clean and unobstructed allowing debris to be removed. Additionally, as further illustrated in FIG. 2 since the pad is located on the underside of the leveler, no part of the truck can come in contact with it. Thus, damage from truck movement, a forklift truck operation, or the like is affirmatively prevented.

FIG. 2 also illustrates side rails 62. Those rails are necessary given the shelf mounting of the vertically stored leveler to prevent forklifts and the like from inadvertently falling off the side of the unit.

Referring now to FIGS. 3, 4, and 5, the details of attaching the pad 60 to the underside of the leveler are depicted. In accordance with this invention, the fabric cover of the seal is sewn into a tube or sleeve on each side of the seal. These are illustrated as elements 62, 64. A strip of metal 66 (see FIG. 5) is inserted into each sleeve and the seal is attached to the deck by means of screws 68. Those screws are generally inserted through the strips into the deck beams 30. By this technique, the strip provides clearance over which the hydraulic cylinder 36 or any other component may protrude beyond the beams. Consequently, using this technique a continuous seal may be formed thus, affectively not having any gaps between the underside of the deck and the housing.

Figure 6B:
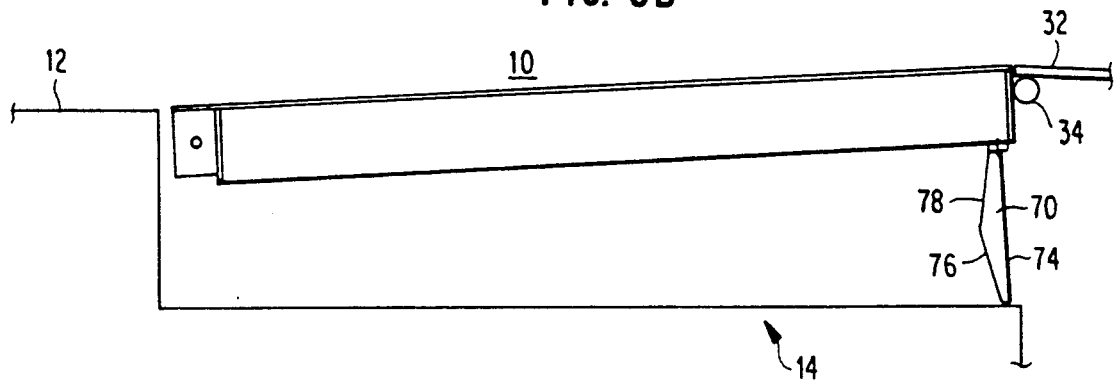
Figure 6C:
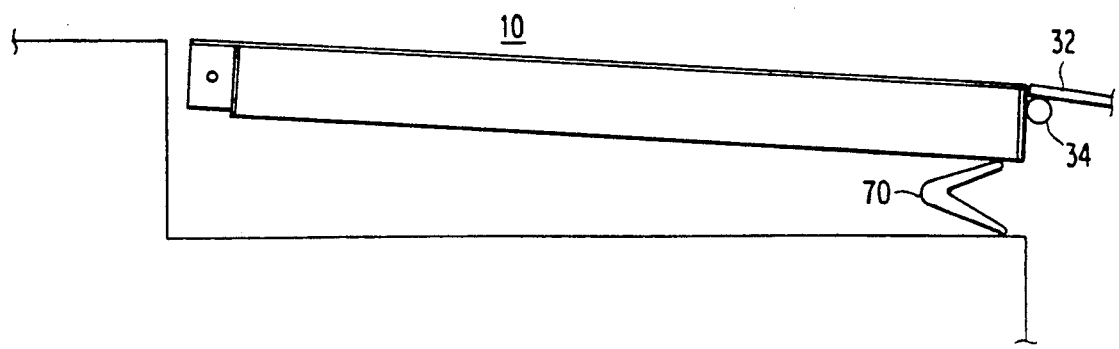

Referring now to FIGS. 6A, 6B and 6C a second preferred embodiment of this invention is illustrated. In this embodiment the bottom pad 70 differs from that in the first embodiment in that it is attached by member 72 to the underside of the leveler 10 for pivoting movement. Member 72 may be a hinge or the seal cover itself affixed to the deck with the fabric providing the flex point. As illustrated in FIG. 6A and FIG. 6B, the bottom pad hangs pendant and contacts the pit surface 14 when the deck is lowered. When the deck is in the raised stored position shown in FIG. 6A the pad 70 sits essentially flush to the underside thereof. By this technique unwanted protrusions are eliminated. In the lowered position illustrated in FIG. 6B, the bottom pad 70 seals the space below the leveler as in the first embodiment.

The pad 70 is configured for buckling compression as opposed to bulging when used in a below dock mode as illustrated in FIG. 6C. Buckling is a preferred mode of deformation since the pad bends at a predictable point thus eliminating billowing of the covering fabric. The pad 70 has a generally flat outwardly projecting surface 74 and a pair of inwardly projecting surfaces 76, 78, that form an obtuse angle. As illustrated, the maximum cross-sectional thickness of the pad 70 is near the center with the thickness tapering to each end. With this configuration the pad 70 has sufficient strength to seal yet slightly yield as vehicles pass over the deck in the cross traffic position of FIG. 6B. However, as illustrated in FIG. 6C when the leveler 10 is lowered for operation below dock level the pad 70 will buckle, deflecting with less compression of the foam. This buckling mode of deformation thus minimizes billowing of the cover since it is in tension.

The bottom pad 70 typically has a length substantially equal to the width of the deck. It may, however, be extended laterally beyond the deck to provide a seal extending the width of the dock. In accordance with this invention an additional pad system is used to seal the sides. Conventionally, weather seals are used on each side and above the door opening, the bottom pad seals the underside. While additional padding in the form of wedges and the like may be used they are subject to excessive wear and abuse as trucks back into the loading dock. Rather than seal with stationary members that are impacted by the rear of trucks, this invention provides for a series of pads carried by the leveler.

Referring now to FIGS. 7A, 7B, 7C, and 7D, a third embodiment of this invention is depicted. In these figures, common elements are given, the same reference numbers as in prior embodiments. Thus, in FIGS. 7A and 7B the deck 10 is shown having a lip 32 hingedly coupled by means of the pivot 34. The bottom pad 60 is mounted to the deck in a manner, for example, in the first embodiment. The underside of the deck has a series of U-shaped beams 31.

In accordance with this embodiment of the invention, a side seal 80 is mounted to either side of the deck by a fixing relative to a plate 82 having rivets or the like. While FIG. 7B illustrates only a portion of the deck in front view, it would be understood that the side seal 80 would be placed on both sides of the deck.

Figure 7A:
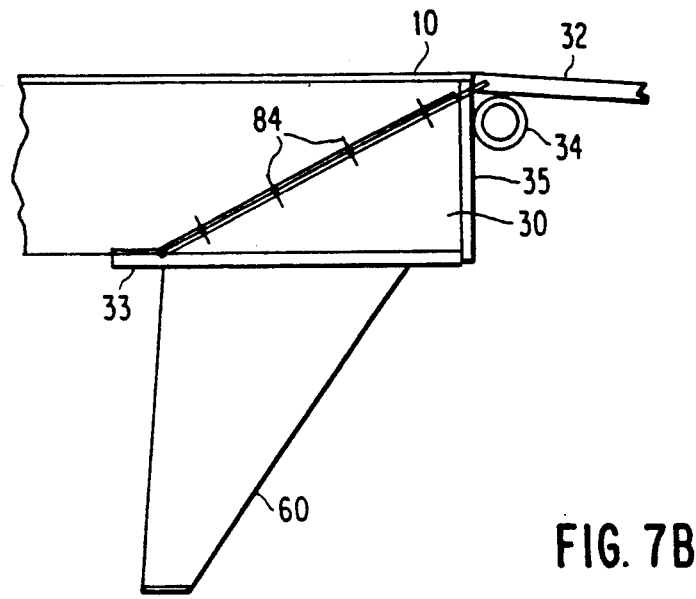
FIGS. 7A, 7B, 7C and 7D illustrate a side view, front view plan view and partial sectional view of a third embodiment of this invention using side wiper extensions to provide a seal.
Figure 7B:
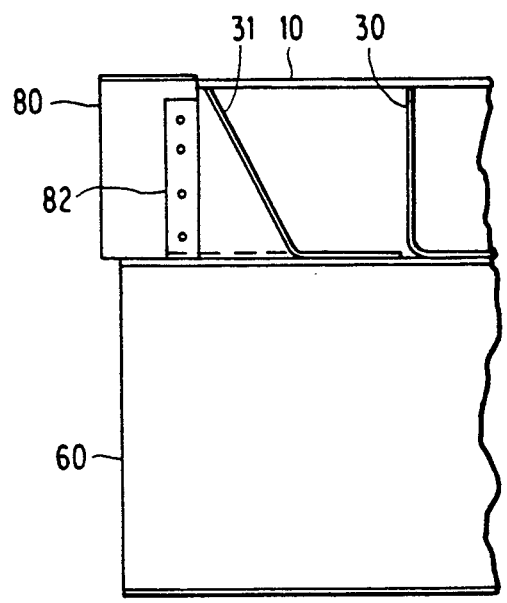
Figure 7C:
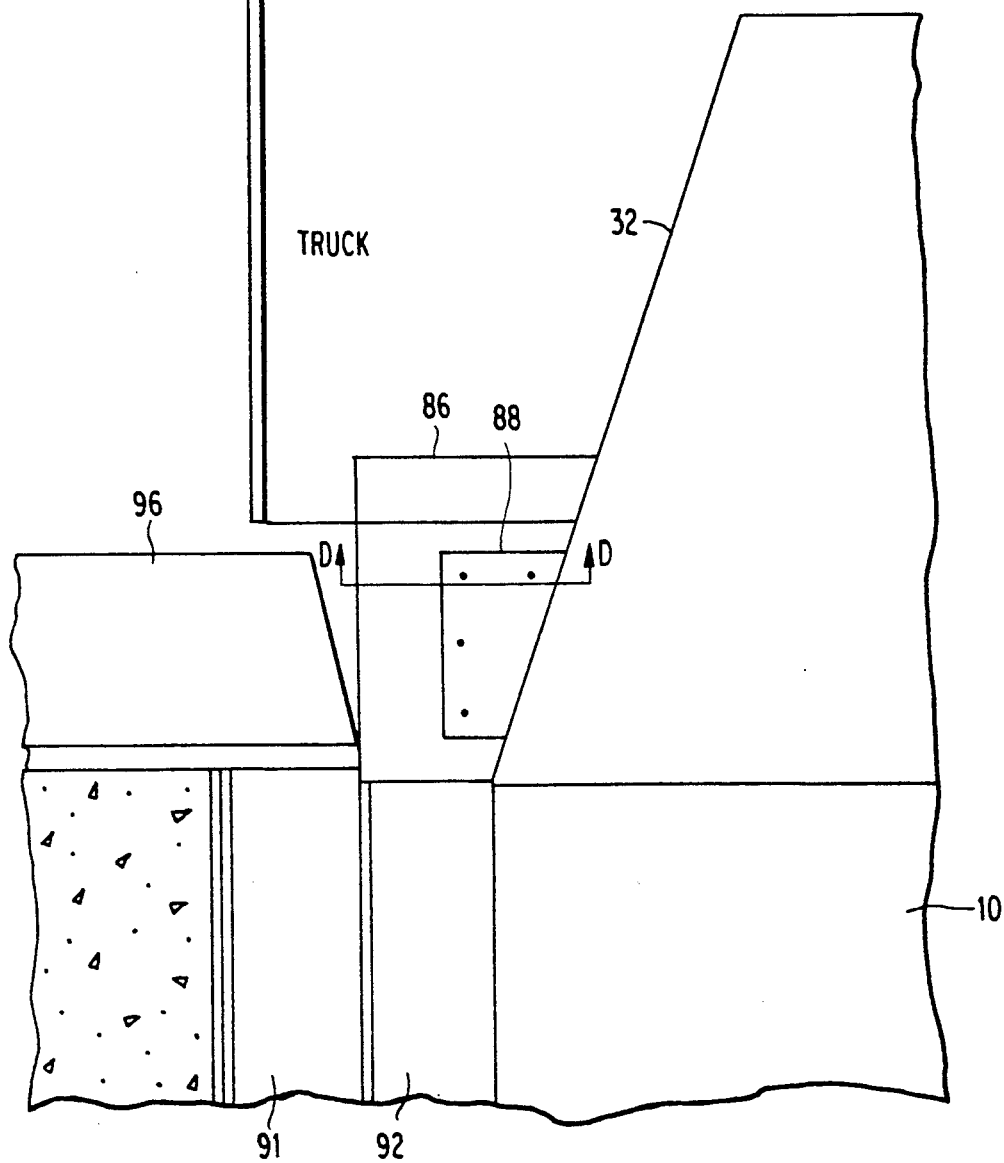
Figure 7D:
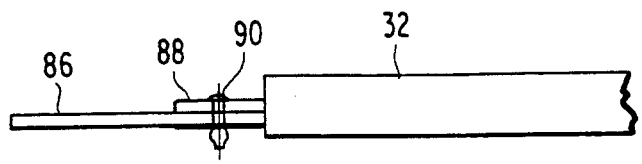

As illustrated in FIG. 7A, the seal may be mounted in an inclined member attaching at one end to a lateral beam member 31 at each end of the deck. Thus, the side seal 80 is affixed to a metal bracket 82 having a series of rivets 84 adjoining those two elements together. The bracket 82 is then fastened at one end to a bottom plate 33 of the deck assembly and at a distal forward portion to a frame member 35. FIG. 7A also illustrates the extension of the side seal 80 above the hinge 34 to effectively seal that portion. FIG. 7B illustrates the extension of the side seal beyond the lateral edge of the deck and the bottom pad 60. This side seal provides one portion of the system to effectively seal the space between the deck and lip and the structure. FIGS. 7C and 7D illustrate the remainder of the system. FIG. 7D is a section taken along section line D—D and FIG. 7C. As illustrated in FIGS. 7C and 7D, an additional side seal 86 is mounted on the lip 32 by means of a flange 88. The seal 86 is coupled to the flange 88 by means of rivets 90 or the like. The flange is then attached to the lip in any conventional manner. As illustrated in FIG. 7C, the side seal on the lip thus pivots with the lip 32. It overlaps the area 92 between the deck 10 and the door frame 94 which has mounted thereon front bumpers 96. Thus, as illustrated in FIG. 7C the wiping action of the side seal 86 provides an effective seal via the lip to shut off the area 92. This, in combination with the side seal on the deck as illustrated in FIGS. 7A and 7B, provides a means by which the opening between the leveler and the conventional weather pads 96 are sealed.

It will be appreciated that various modifications of this invention can be practiced without departing from the essential scope thereof.

What is claimed is:

1. A vertically storing dock leveler comprising; a deck assembly, means at one end of deck assembly for hingedly mounting a said deck assembly to a fixed surface, means to move said deck assembly from an upright stored position to a horizontal operative position; a lip pivotably mounted to an opposite end of said deck assembly, means to move said lip and, a seal pivotably mounted on said deck assembly to close a space between said deck assembly and a floor when said deck assembly is in an operative position.

2. The vertically storing dock leveler of claim 1 wherein said seal extends over substantially the width of said deck assembly.

3. The vertically storing dock leveler of claim 1 wherein said seal comprises a resilient foam covered with fabric.

4. The vertically storing dock leveler of claim 1 wherein said seal comprises an asymmetrically shaped resilient pad, said pad buckling upon contact with said floor without substantial bulging to close said space as the deck assembly is lowered to a position below horizontal.

5. The vertically storing dock leveler of claim 1 wherein said seal is mounted on the underside of the deck assembly near said lip end.

6. The vertically storing dock leveler of claim 1 further comprising means to pivotably attach said seal to an underside of said deck assembly.

7. The vertically storing leveler of claim 1 wherein said seal comprises a wedge shaped resilient pad covered with fabric, said seal buckling and compressing upon contact with said floor to close said space as the deck assembly is lowered.

8. The vertically storing leveler of claim 1 further comprising side rails on the deck assembly to prevent a vehicle from running off the side of the leveler.

9. The vertically storing dock leveler of claim 1 wherein seal comprises a resilient pad tapered at both ends, said pad buckling inward following contact with said floor to close the space as said deck assembly is lowered below a horizontal position.

10. The vertically storing dock leveler of claim 1 further comprising means to said lock to deck assembly into said stored position.

11. A vertically storing dock leveler comprising:
a hingedly mounted deck assembly having at one end a movable lip; means to move deck assembly and lip, deck assembly mounted to a fixed surface including a generally horizontal floor, said deck assembly stored in a substantially vertical position and lowered into a substantially horizontal operative position, a first seal mounted on said deck assembly to close a space between deck assembly and floor when said deck assembly is in an operative position by contacting the ground and deforming and, a second seal carried by said dock leveler to seal a space between sides of said leveler and an adjacent surface.

12. The vertically storing dock leveler of claim 11 wherein said first seal extends beyond the width of deck assembly.

13. The vertically storing dock leveler of claim 11 wherein first seal comprises a resilient foam covered with fabric.

14. The vertically storing dock leveler of claim 11 wherein first seal comprises a wedge shaped resilient pad, said pad buckling upon contact with floor to close said space as deck assembly is lowered and bending as no deck assembly is lowered below dock level.

15. The vertically storing dock leveler of claim 11 wherein second seal is mounted to sides of said deck assembly near said lip.

16. The vertically storing dock leveler of claim 11 wherein said second seal comprises a wiping member mounted to said lip and wherein said second seal has a flange mounting it to said lip.

17. The vertically storing leveler of claim 11 wherein said second seal comprises a first resilient wiper member mounted to said deck assembly and a second wiper member mounted to said lip, wherein said first and second wiper members seal a space between said dock leveler and an adjacent lateral structure.

18. The vertically storing leveler of claim 11 further comprising side rails on the deck assembly to prevent a vehicle from running off the side of said leveler.

19. The vertically storing dock leveler of claim 11 wherein first seal comprises a tapered resilient pad, wherein said pad deflects upon contact with floor to close said space as the deck assembly is lowered.

20. The vertically storing dock leveler of claim 11 further comprising means to lock to the deck assembly in a stored position.

* * * * *